United States Patent

Browne et al.

[11] Patent Number: 5,201,385
[45] Date of Patent: Apr. 13, 1993

[54] SEAT BELT ACTUATED BY ANTILOCK BRAKE SYSTEM

[75] Inventors: Alan L. Browne, Grosse Pointe; Jenne-Tai Wang; Yuen-Kwok Chin, both of Troy, all of Mich.

[73] Assignee: General Motors Corporation, Detroit, Mich.

[21] Appl. No.: 558,546

[22] Filed: Jul. 26, 1990

[51] Int. Cl.⁵ ............................................. B60R 22/36
[52] U.S. Cl. ..................................... 180/268; 280/807
[58] Field of Search ............... 180/268, 271, 282; 280/432, 801, 802, 807, 806; 188/1.11; 340/453; 242/107.4 A

[56] References Cited

U.S. PATENT DOCUMENTS

| | | | |
|---|---|---|---|
| 3,220,747 | 11/1965 | Marion | 180/268 |
| 3,452,834 | 7/1969 | Gaut | 180/268 |
| 3,610,361 | 10/1971 | Pringle | 180/82 |
| 3,713,506 | 1/1973 | Lipschutz | 180/82 |
| 3,838,746 | 10/1974 | Andres | 180/82 |
| 4,116,295 | 9/1978 | Booth | 180/82 |
| 4,285,479 | 8/1981 | Blom | 242/107.4 |
| 4,597,587 | 7/1986 | Yoshitsugu et al. | 280/807 |
| 4,655,312 | 4/1987 | Frantom et al. | 180/268 |
| 4,722,550 | 2/1988 | Imaoka et al. | 180/268 |
| 4,790,561 | 12/1988 | Brown | 180/268 |
| 4,876,525 | 10/1989 | Gross | 340/435 |

FOREIGN PATENT DOCUMENTS

| | | | |
|---|---|---|---|
| 2246296 | 3/1974 | Fed. Rep. of Germany | 180/268 |
| 2216391 | 10/1989 | United Kingdom | 280/806 |

Primary Examiner—Tamara L. Graysay
Attorney, Agent, or Firm—Charles E. Leahy

[57] ABSTRACT

A motor vehicle is equipped with an occupant seat belt system including a belt retractor having associated control mechanism such as a reel locking mechanism, a tension relieving mechanism, and/or a belt tensioning mechanism. The onset of a incipient wheel lock up condition sensed by the antilock brake system triggers the retractor associated mechanism so that restraint of the occupant is initiated in response to wheel condition independent of actuation by a sensed condition of vehicle deceleration.

6 Claims, 2 Drawing Sheets

SEAT BELT ACTUATED BY ANTILOCK BRAKE SYSTEM

The invention relates to a seat belt system and more particularly to a seat belt system in which restraint of the occupant is initiated in response to an incipient wheel lock condition sensed by the antilock brake system.

BACKGROUND OF THE INVENTION

It is well known in motor vehicles to provide a seat belt system for restraining an occupant in the vehicle seat. The seat belt system typically includes a retractor having a spring biased reel which winds the shoulder belt to a taut condition about the occupant A reel locking mechanism is conventionally provided and is responsive to a sensed condition of vehicle deceleration to lock the reel against belt unwinding rotation.

It is also known in such vehicle brake systems to provide a pyrotechnic device or spring device associated with the wheel and adapted to forcibly retract the belt in order to tension the belt around the occupant.

Furthermore is it known to provide a tension relieving mechanism associated with the seat belt retractor and including a lock bar engageable with the belt reel to prevent belt rewinding by the wind-up spring so that the belt is held at a slackened condition about the vehicle occupant.

It is also known in motor vehicles to provide an antilock brake system in which sensors associated with the vehicle wheels communicate with an electronic control unit which determines the onset of an incipient wheel lock condition and then controls the vehicle brake system to alternately release and reapply the brakes.

In addition, it is known in the prior art to connect the brake pedal of the vehicle to the seat belt retractor so that the retractor is locked whenever the driver applies the brakes.

It would be desirable to provide a seat belt system in which restraint of the occupant by the belt system would be initiated in response to the wheel condition sensed by the antilock brake system.

SUMMARY OF THE INVENTION

According to the invention, a motor vehicle is equipped with an occupant seat belt system including a belt retractor having associated control mechanism such as a reel locking mechanism, a tension relieving mechanism, and/or a belt tensioning mechanism. The onset of a incipient wheel lock up condition sensed by the antilock brake system triggers the retractor associated control mechanism so that restraint of the occupant is initiated in response to wheel condition independent of retractor initiation by a sensed condition of vehicle deceleration.

In one embodiment of the invention, the antilock electronic control unit energizes a solenoid which actuates the retractor locking mechanism to lock the retractor reel against belt unwinding rotation.

In another embodiment of the invention, the signal generated by the antilock electronic control unit energizes a solenoid to release a tension relieving mechanism so that the wind-up spring of the retractor rewinds the belt to a taut condition about the occupant.

In another embodiment of the invention, the control signal generated by the antilock electronic control unit triggers a belt tensioning device associated with the retractor to forcibly rotate the retractor reel in the belt winding direction to substantially tighten the belt about the occupant.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
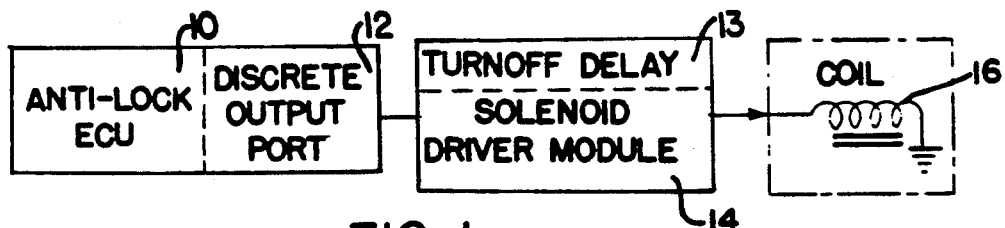
FIG. 1 is a schematic diagram of a seat belt system controlled by the antilock brake system in accordance with present invention.

Referring to FIG. 1, a vehicle antilock brake system includes an antilock electronic control unit (ECU) 10 having a discrete output port 12 which is electrically connected to a solenoid driver module 14 which is in turn connected to a coil 16 of a solenoid or electromagnet. The antilock electronic control unit 10 receives input signals from sensors mounted on each of the vehicles wheels and processes these signals to provide various signal outputs used to control the brakes by releasing and reapplying the brakes in response to the onset of an incipient wheel lock condition. The discrete output port 12 provides a signal which energizes the solenoid driver module 14, which in turn provides a signal of appropriate voltage to energize the coil 16. The signal provided at the output port 12 and solenoid driver module 14 is preferably of a constant amplitude during the antilock control of the brakes so that the coil 16 remains energized during the cyclic release and reapply of the brakes. The signal may comprise the signal used by the central unit to energize an isolation valve in the brake system that isolates the brake system master cylinder from the remainder of the brake system. In addition, a turnoff time delay 13 may be interposed in the system to cause the coil 16 to remain energized for a predetermined number of seconds after the electronic control unit 10 ceases to control the brakes.

Figure 2:
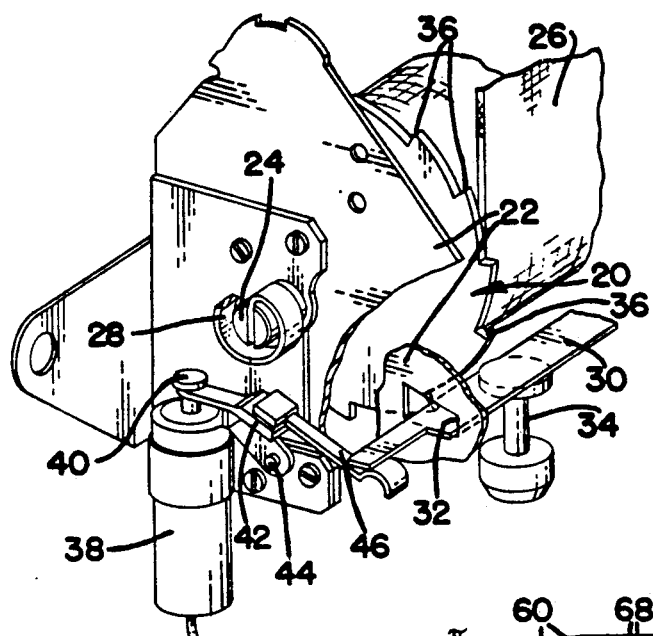
FIG. 2 is a perspective view of a seat belt retractor having a solenoid for lifting a lock bar into engagement with a belt reel to initiate lockup of the retractor independent of a vehicle deceleration sensing pendulum.

FIG. 2 shows a fragmentary view of a typical seat belt retractor in which a belt reel 20 is rotatably mounted on a housing 22 by a reel shaft 24. A shoulder belt 26 is wound upon the reel 20 and may be unwound from the reel against the bias of a conventional belt wind-up spring 28. A retractor locking mechanism includes a lock bar 30 which is rotatably mounted in a slot 32 in the housing 22. A pendulum assembly 34 is mounted on a support, not shown, and tilts upon the occurrence of a predetermined vehicle deceleration and pivotally lifts the lock bar 30 into engagement with one of a plurality of ratchet teeth 36 carried by the reel 20.

Alternatively, the lockup of the reel 20 by the lock bar 30 may be initiated by the antilock brake system. In particular, a solenoid 38 is mounted on the housing 22 and includes a plunger 40 which engages a lever assembly 42 mounted on the housing 22 by pivot 44. The lever assembly 42 carries a leaf spring 46 which underlies the end of lock bar 30 so that energization of the coil 16 within solenoid 38 will retract plunger 40 and thereby pivot lever assembly 42 so that the spring 46 will raise the lock bar 30 into engagement with one of the plurality of teeth 36. Thus, it will be understood that the seat belt retractor may be locked by either the vehicle deceleration sensed by the pendulum 34, or by the incipient wheel lock condition sensed by the antilock brake system.

It will also be understood that the use of a turn off delay 13 in the control circuit of FIG. 1 will maintain energization of the solenoid 38 for a number of seconds so that the retractor will remain locked even after the antilock brake system has ceased to control the brakes. Such a time delay may be provided by a software or hardware counter in the antilock ECU 10 or may be provided by the optional turn off delay 13, shown in FIG. 3.

Figure 3:
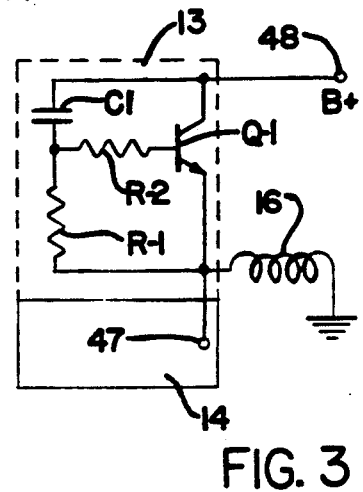
FIG. 3 is a circuit diagram of the turn off delay of FIG. 1.

Referring to FIG. 3, the turn off time delay 13 receives a control signal from contact 47 of solenoid driver module 14 and is connected to the solenoid 16. Accordingly, when the control signal is communicated to contact 47, the coil 16 is energized. When the electronic control unit 10 no longer provides an input to the solenoid driver module 14, the contact 47 is opened so that neither voltage nor ground is communicated thereto. When the contact 47 is first opened, a transistor Q-1 is biased conductive for a predetermined time delay established by a timing circuit including a capacitor C-1 and resistor R-1 to energize the solenoid 16 via the vehicle ignition battery voltage B+. Therefore, for the period of the time delay, the solenoid 16 is maintained energized. In general, when the contact 47 is opened, the voltage developed across the resistor R-1 and coupled to the base of the transistor Q-1 through a resistor R-2 while the capacitor C-1 charges biases the transistor conductive to maintain the solenoid 16 energized. When the capacitor C-1 becomes charged substantially to the voltage B+ so that the voltage across the resistor R-1 is inadequate to bias the transistor Q-1 conductive, the transistor Q-1 becomes nonconductive and the solenoid 16 is then deenergized. The rate of charge of the capacitor C-1 is determined by the capacitance of the capacitor C-1 and the resistance of the resistor R-1. Therefore, any desired length of the time delay before deenergizing the solenoid 16 after termination of the control signal at contact 47 may be provided by proper sizing of those circuit elements Accordingly, it will be understood that the coil 16 of the solenoid 38 will remain energized for a set number of seconds after the antilock electronic control unit 10 has ceased to control the brakes.

Figure 4:
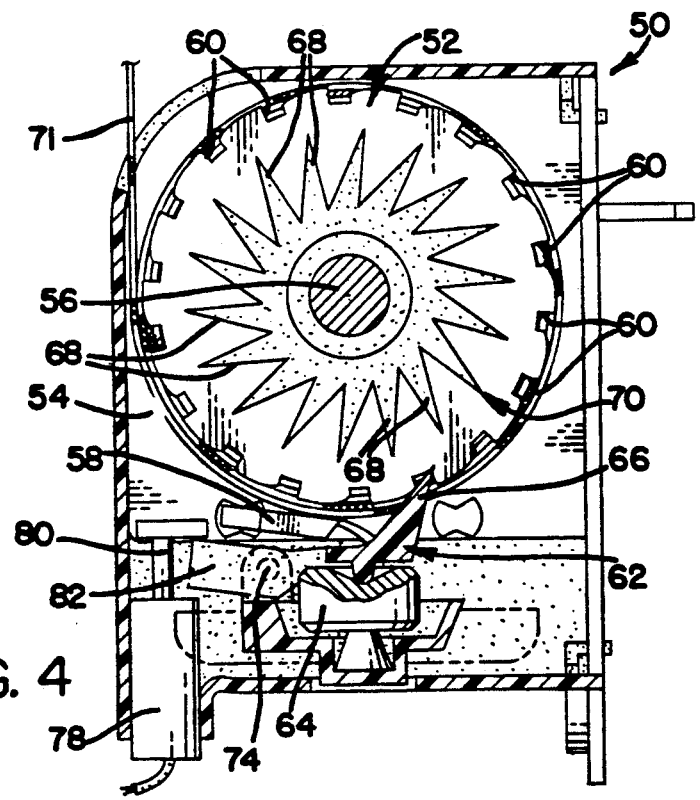
FIG. 4 is a side elevation view of a seat belt retractor having a solenoid to engage a pilot pawl with a drive gear for forcibly lifting a lock bar into engagement with a belt reel initiate occupant restraint.

Referring to FIG. 4, the seat belt retractor 50 includes reel 52 mounted on housing 54 by reel shaft 56. A lock bar 58 is pivotally mounted on the housing 54 and may be raised to engage one of the plurality of locking teeth 60 carried by the reel 52. A pilot pawl of lightweight plastic rests upon a pendulum 64. A predetermined vehicle deceleration upsets the pendulum which in turn lifts the pilot pawl 62 so that its tooth 66 engages one of a plurality of teeth 68 of a pilot gear 70 which rotates with the reel 52. The unwinding of shoulder belt 71 from the reel 52 rotates the pilot gear 70 so that the tooth 68 lifts the pilot pawl 62 upwardly about pivot 74 and the pilot pawl will in turn lift the lock bar 58 into engagement with the teeth 60 carried by the reel 52.

Alternatively, this pilot locking mechanism can be actuated by a solenoid 78 mounted on the housing 54 and having a plunger 80 which, when retracted, engages the tail end 82 of pilot pawl 62 and rotates pilot pawl 62 so that the tooth 66 engages the pilot gear teeth 68 to forcibly lift the pilot pawl 62 further and thereby engage the lock bar 58 with reel teeth 60. The solenoid 78 includes a coil 16 as shown in FIG. 1 so that the sensed wheel lock condition will energize the solenoid to initiate the lock up of the seat belt retractor 50.

Figure 5:
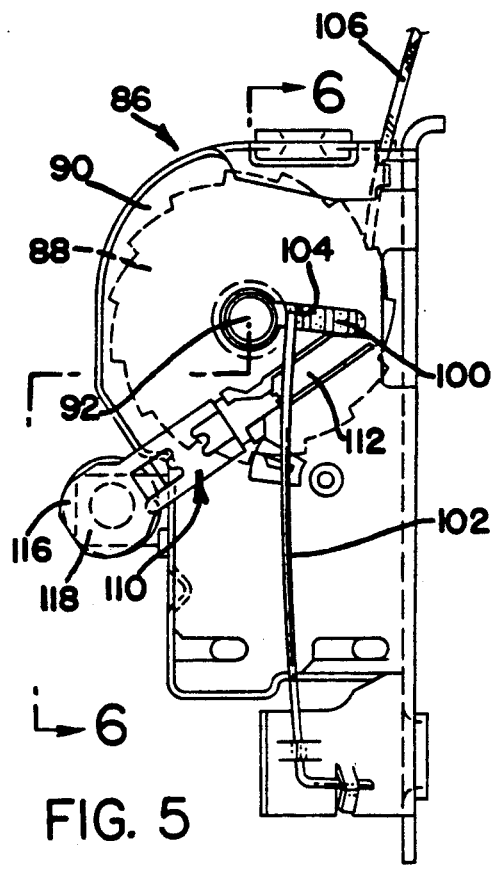
FIG. 5 is a side elevation view of a seat belt retractor having a tension relieving device adapted to be released by an electromagnet.
Figure 6:
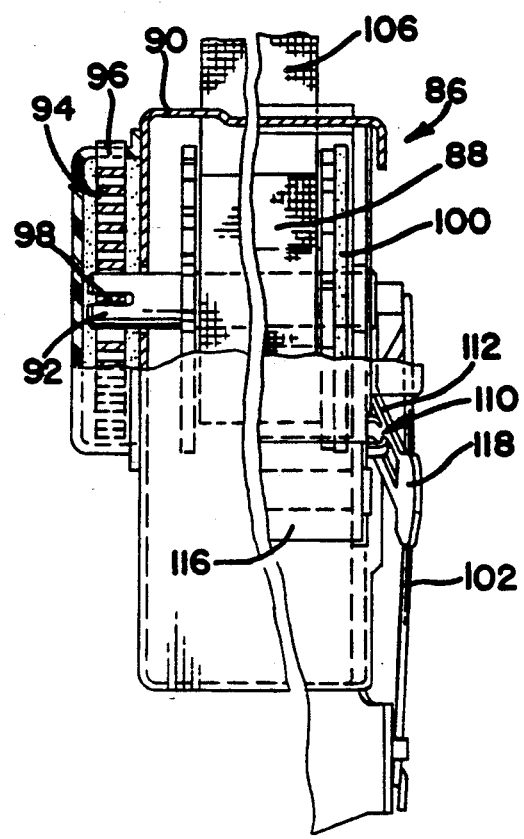
FIG. 6 is a fragmentary view taken in the direction of arrows 6—6 of FIG. 5.

Another embodiment of the invention is shown in FIGS. 5 and 6 in which the seat belt retractor 86 has belt reel 88 mounted on housing 90 by reel shaft 92. As best seen in FIG. 6, a wind-up spring 94 has an outer end 96 anchored on housing 90 and an inner end 98 engaging the reel shaft 92 so that energy is stored in the spring 94 and rotates the reel 88 in the belt winding direction of rotation The retractor 86 has a pendulum actuated lockup mechanism, not shown, similar to FIG. 2 or FIG. 4 for locking the reel against rotation in the belt unwinding direction in response to vehicle deceleration condition.

The retractor 86 also has a tension relieving device which includes a molded plastic control disc 100 which is attached to the reel 88 for rotation therewith. The face of the control disc 100 includes a plurality of ratchet teeth displayed along a complexly arranged spiral path of grooves, ramps, and escapements. A tension relieving pawl 102 in the form of a bent spring wire anchored on housing 90 extends through a window 104 in the housing 90 and engages with the control disc 100. The control disc 100 biases the pawl 102 through a sequence of positions by which the pawl 102 becomes engaged with the ratchet teeth carried by the control disc 100 to lock the reel 88 against belt winding rotation by the wind-up spring 94 so that the shoulder belt 106 is held at a slackened tensionless condition about the occupant.

Mechanism for releasing the pawl 102 from engagement with the ratchet teeth of the control disc includes a lever mechanism 110 pivotally mounted on the housing 90 and having a lever end 112 which underlies the pawl 102. An electromagnet 116 is mounted on the housing 90 and includes a coil 16 coupled to the antilock brake system as shown in FIG. 1 Energization of the electromagnet 116 attracts an armature end 118 of the lever 110 leftwardly as viewed in FIG. 6 so that the opposite end 112 of the lever 10 lifts the pawl 102 rightwardly as viewed in FIG. 6 to disengage the pawl 102 from the ratchet teeth and thereby enable the wind-up spring 94 to initiate the occupant restraint sequence by restoring the belt 106 to a tensioned condition about the occupant in response to the onset of a sensed wheel lock condition. Reference may be had to U.S. Pat. No. Fisher Et. al. 4,002,311 for a more detailed description of the retraction 86 of FIGS. 5 and 6.

Figure 7:
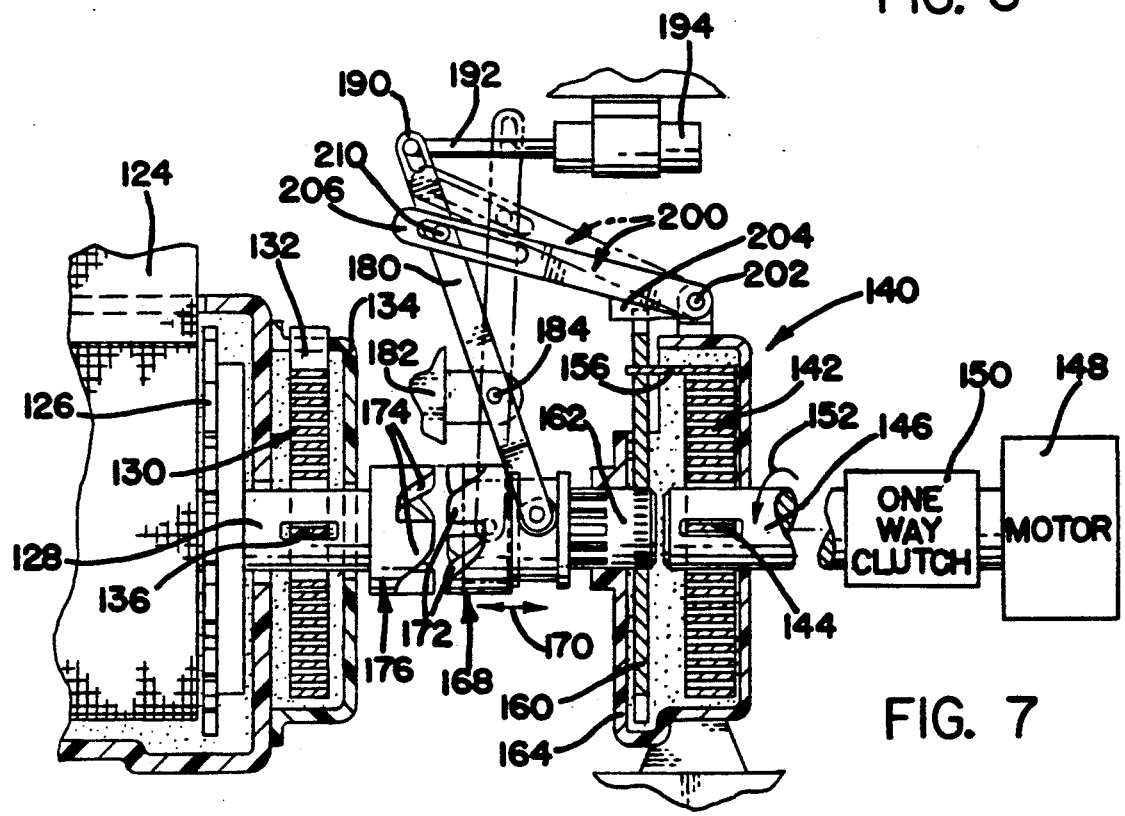
FIG. 7 is a front elevation view of a seat belt retractor having a motor wound spring apparatus for selectively tensioning the seat belt retractor to forcibly rewind the belt about the occupant.

Another embodiment of the invention is shown in FIG. 7 in which the shoulder belt 124 is mounted on reel 126 rotatably mounted by reel shaft 128. A wind-up spring 130 has an outer end 132 anchored on spring housing 134 and an inner end 136 attached to the reel shaft 128 to bias the reel 126 in the belt winding direction of rotation. The wind-up spring 130 provides a belt winding bias sufficient to retain the shoulder belt 124 at a taut condition about the occupant torso.

A tensioning spring apparatus generally indicated at 140 is provided to forcibly wind the shoulder belt 124 to a tightened condition about the seated occupant. The belt tensioning apparatus 140 includes a tensioning spring 142 having an inner end 144 which is attached to an input shaft 146 coupled to an electric motor 148 through a one way clutch 150. When the motor 148 is energized, the shaft 146 is rotated in the direction of arrow 152 to wind-up and store energy in the tensioning spring 142. The one way clutch 150 permits the shaft 146 to rotate only in the direction of arrow 152 so that the energy stored in the tensioning spring 142 cannot back drive the motor 148. The tensioning spring 142 also has an outer end 156 which is anchored on a toothed plate 160 staked to an output shaft 162. The output shaft 162 is rotatably journaled on a housing 164 and carries a clutch collar 168 which is splined to the output shaft 162 for rotation therewith and yet is permitted to move axially in the direction of arrow 170. The clutch collar 168 carries end teeth 172 which mesh with end teeth 174 carried on a clutch collar 176 attached to the reel shaft 128.

The clutch collar 168 is moveable left and right in the direction of arrow 170 by a fork lever 180. The fork lever 180 has a center portion pivotally mounted on stationary housing 182 by a pivot 184. The forked end of fork lever 180 engages shift collar 168 while the opposite end 190 is connected to a plunger 192 of solenoid 194. The solenoid 194 has a coil 16 as shown in FIG. 1 so that energization of the solenoid 194 retracts plunger 192 thereby shifting fork lever 180 to the phantom line indicated position thrusting shift collar 168 leftwardly into engagement with shift collar 176.

The toothed plate 160 is normally locked against rotation relative to housing 164 by a lock lever 200 having an end mounted by pivot 202 and a lock tooth 204 engaging with the toothed plate 160. The end 206 of lock lever 200 is slotted and engages a pin 210 carried by the fork lever 180 so that the pivoting of the fork lever 180 by the solenoid 194 will simultaneously lift the lock lever 200 to the phantom line indicated position to carry lock tooth 204 out of engagement with the toothed plate 160. Thus the energization of the solenoid 194 functions to provide a driving connection between the output shaft 162 and the reel shaft 128 through the engagement of the shift collar 168 with the clutch collar 176, and simultaneously unlocks the tooth plate 160 so that the energy stored in the tensioning spring 142 forces rotation of the toothed plate 160 and output shaft 162 to drive the reel shaft 128 in the belt winding direction. The tensioning spring 142 is substantially stronger than the wind-up spring 130 so that the reel 126 is forcibly rotated in the direction to substantially tighten the shoulder belt 124 about the seated occupant.

Thus is it seen that the invention provides a new and improved seat belt system in which the initiation of restraint of the occupant is triggered by the antilock brake system. Furthermore, it is appreciated that it is within the scope of the invention to employ the invention in conjunction with seat belt retractors control mechanisms of the type having locking mechanisms, tension relieving mechanisms, and spring wind-up mechanisms.

The embodiments of the invention in which an exclusive property or privilege is claimed are defined as follows:

1. In a vehicle having an antilock brake system which senses a condition of incipient wheel lock and a seat belt retractor actuatable to initiate occupant restraint in response to a sensed condition of vehicle deceleration, the improvement comprising:

signal generating means associated with the antilock brake system generating a signal indicative of sensation of a condition of incipient wheel lock, and means responsive to the signal generated by the signal generating means actuating the seat belt retractor to initiate occupant restraint in response to the sensed condition of incipient wheel lock.

2. In a vehicle having an antilock brake system which senses a condition of incipient wheel lock and a seat belt retractor actuatable to initiate occupant restraint in response to a sensed condition of vehicle deceleration, the improvement comprising:

signal generating means associated with the antilock brake system generating a signal indicative of sensation of a condition of incipient wheel lock, means responsive to the signal generated by the signal generating means actuating the seat belt retractor to initiate occupant restraint in response to the sensed condition of incipient wheel lock, and time delay means effective to maintain the signal generated by the signal generating means for a predetermined time after cessation of the sensed condition of incipient wheel lock to thereby maintain the actuation of the seat belt retractor.

3. In a vehicle having an antilock brake system which senses a condition of incipient wheel lock and a seat belt retractor actuatable to initiate occupant restraint in response to a sensed condition of vehicle deceleration, the improvement comprising:

spring means associated with the retractor and acting to wind the belt to a tensioned condition about the occupant, tension relieving means acting to hold the belt at a slackened condition against the effort of the spring means and being releasable to restore the winding effort of the spring means, signal generating means associated with the antilock brake system generating a signal indicative of sensation of a condition of incipient wheel lock, and means responsive to the signal generated by the signal generating means releasing the tension relieving means so that occupant restraint is initiated by the spring means rewinding the belt to a tensioned condition about the occupant in response to the sensed condition of incipient wheel lock.

4. In a vehicle having an antilock brake system which senses a condition of incipient wheel lock and a seat belt retractor actuatable to initiate occupant restraint in response to a sensed condition of vehicle deceleration, the improvement comprising:

retractor locking means locking the retractor against belt unwinding so that the occupant is restrained, vehicle deceleration sensing means associated with the retractor locking means and locking the retractor in response to vehicle deceleration, signal generating means associated with the antilock brake system generating a signal indicative of wheel lock condition, and means responsive to the signal generated by the signal generating means locking the retractor locking means independent of the condition of the vehicle deceleration sensing means.

5. In a vehicle having an antilock brake system which senses a condition of incipient wheel lock and a seat belt retractor actuatable to initiate occupant restraint in response to a sensed condition of vehicle deceleration, the improvement comprising:

retractor locking means locking the retractor against belt unwinding so that the occupant is restrained, vehicle deceleration sensing means associated with the retractor locking means and locking the retractor in response to vehicle deceleration, signal generating means associated with the antilock brake system generating a signal indicative of wheel lock condition, means responsive to the signal generated by the signal generating means locking the retractor locking means independent of the condition of the vehicle deceleration sensing means, and time delay means effective to maintain the signal generated by the signal generating means for a predetermined time after cessation of the sensed condition of incipient wheel lock to thereby maintain the actuation of the seat belt retractor for a predetermined time.

6. In a vehicle having an antilock brake system which senses a condition of incipient wheel lock and a seat belt retractor actuatable to initiate occupant restraint in response to a sensed condition of vehicle deceleration, the improvement comprising:

spring means associated with the retractor and acting to wind the belt to a tensioned condition about the occupant, tensioning means actuatable to further tension and wind the belt about the occupant, signal generating means associated with the antilock brake system adapted to generate a signal indicative of sensation of a condition of incipient wheel lock, and means responsive to the signal generated by the signal generating means actuating the tensioning means so that occupant restraint is initiated by the tensioning means winding the belt to a tensioned condition about the occupant in response to the sensed condition of incipient wheel lock.

* * * * *